(12) United States Patent
Ono

(10) Patent No.: US 7,499,195 B2
(45) Date of Patent: Mar. 3, 2009

(54) PRINTING APPARATUS AND CONTROL METHOD THEREFOR

(75) Inventor: Takashi Ono, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 623 days.

(21) Appl. No.: 11/195,668

(22) Filed: Aug. 3, 2005

(65) Prior Publication Data

US 2006/0028664 A1    Feb. 9, 2006

(30) Foreign Application Priority Data

Aug. 6, 2004    (JP)    ............... 2004-231441

(51) Int. Cl.
*G06F 15/00* (2006.01)
*G06K 1/00* (2006.01)

(52) U.S. Cl. .................. 358/1.9; 358/2.1; 358/3.24

(58) Field of Classification Search ................ 358/1.15, 358/1.9, 2.1, 3.24, 3.27, 1.13, 1.18, 518, 358/527; 709/224, 246; 348/207.2, 222.1, 348/333.12
See application file for complete search history.

(56) References Cited

U.S. PATENT DOCUMENTS

| 7,154,633 | B2 * | 12/2006 | Shimazaki | ................. 358/1.9 |
| 7,155,504 | B1 * | 12/2006 | Fujieda | ....................... 709/224 |
| 7,372,595 | B1 * | 5/2008 | Lyon et al. | ................... 358/1.9 |
| 2008/0075370 | A1 * | 3/2008 | Hanyu | ........................ 382/195 |

* cited by examiner

*Primary Examiner*—Edward L Coles
*Assistant Examiner*—Satwant K Singh
(74) *Attorney, Agent, or Firm*—Fitzpatrick, Cella, Harper & Scinto

(57) ABSTRACT

The format of attribute information is determined based on header information included in print data (S1102 to S1106), and image processing in accordance with the attribute information based on the decided format is performed for the result of rendering performed in accordance with print data (S1111).

9 Claims, 20 Drawing Sheets

FIG. 4

| bit 3 | bit 2 | bit 1 | bit 0 |
|---|---|---|---|
| Thin / Small | Text / Graphics | / Image | GRAY COMPENSATION |

F I G. 5

| ATTRIBUTE | GRAY COMPENSATION | BIT STRING | | | |
|---|---|---|---|---|---|
| | | Thin / Small | Text / Graphics / Image | | GRAY COMPENSATION |
| IMAGE | Off | 0 | 0 | 0 | 0 |
| IMAGE | On | 0 | 0 | 0 | 1 |
| GRAPHIC | Off | 0 | 0 | 1 | 0 |
| GRAPHIC | On | 0 | 0 | 1 | 1 |
| LINE | Off | 0 | 1 | 0 | 0 |
| LINE | On | 0 | 1 | 0 | 1 |
| CHARACTER | Off | 0 | 1 | 1 | 0 |
| CHARACTER | On | 0 | 1 | 1 | 1 |
| THIN LINE | Off | 1 | 1 | 0 | 0 |
| THIN LINE | On | 1 | 1 | 0 | 1 |
| LOWER-CASE CHARACTER | Off | 1 | 1 | 1 | 0 |
| LOWER-CASE CHARACTER | On | 1 | 1 | 1 | 1 |

FIG. 6

| bit 3 | bit 2 | bit 1 | bit 0 |
|---|---|---|---|
| Thin / Small | Text / Graphics / Image | | CMS |

FIG. 7

| ATTRIBUTE | DEVICE CMS | BIT STRING | | |
| --- | --- | --- | --- | --- |
| | | Thin / Small | Text / Graphics / Image | CMS |
| IMAGE | Off | 0 | 0 | 0 | 0 |
| IMAGE | On | 0 | 0 | 0 | 1 |
| GRAPHIC | Off | 0 | 0 | 1 | 0 |
| GRAPHIC | On | 0 | 0 | 1 | 1 |
| LINE | Off | 0 | 1 | 0 | 0 |
| LINE | On | 0 | 1 | 0 | 1 |
| CHARACTER | Off | 0 | 1 | 1 | 0 |
| CHARACTER | On | 0 | 1 | 1 | 1 |
| THIN LINE | Off | 1 | 1 | 0 | 0 |
| THIN LINE | On | 1 | 1 | 0 | 1 |
| LOWER-CASE CHARACTER | Off | 1 | 1 | 1 | 0 |
| LOWER-CASE CHARACTER | On | 1 | 1 | 1 | 1 |

FIG. 11

| ATTRIBUTE | DEVICE CMS | BIT STRING | | | |
|---|---|---|---|---|---|
| | | Thin / Small | Text / Graphics / Image | | CMS |
| IMAGE | Off | 0 | 0 | 0 | 0 |
| IMAGE | On | 0 | 0 | 0 | 1 |
| GRAPHIC | Off | 0 | 0 | 1 | 0 |
| GRAPHIC | On | 0 | 0 | 1 | 1 |
| LINE | Off | 0 | 1 | 0 | 0 |
| LINE | On | 0 | 1 | 0 | 1 |
| CHARACTER | Off | 0 | 1 | 1 | 0 |
| CHARACTER | On | 0 | 1 | 1 | 1 |
| THIN LINE | Off | 1 | 1 | 0 | 0 |
| THIN LINE | On | 1 | 1 | 0 | 1 |
| LOWER-CASE CHARACTER | Off | 1 | 1 | 1 | 0 |
| LOWER-CASE CHARACTER | On | 1 | 1 | 1 | 1 |

FIG. 12

| bit 3 | bit 2 | bit 1 | bit 0 |
|---|---|---|---|
| lossless / lossy | Text / Graphics | Image | CMS |

F I G. 13

| ATTRIBUTE | CMS | BIT STRING | | |
|---|---|---|---|---|
| | | lossy | Text / Graphics / Image | CMS |
| LOSSLESS IMAGE | Off | 0 | 0 | 0 | 0 |
| LOSSLESS IMAGE | On | 0 | 0 | 0 | 1 |
| LOSSY IMAGE | Off | 1 | 0 | 0 | 0 |
| LOSSY IMAGE | On | 1 | 0 | 0 | 1 |
| GRAPHIC | Off | 0 | 0 | 1 | 0 |
| GRAPHIC | On | 0 | 0 | 1 | 1 |
| LINE | Off | 0 | 1 | 0 | 0 |
| LINE | On | 0 | 1 | 0 | 1 |
| CHARACTER | Off | 0 | 1 | 1 | 0 |
| CHARACTER | On | 0 | 1 | 1 | 1 |

FIG. 15

| bit 3 | bit 2 | bit 1 | bit 0 |
|---|---|---|---|
| lossless / lossy | Text / Graphics / Image | | Gray |

FIG. 16

| ATTRIBUTE | GRAY COMPENSATION | BIT STRING | | | |
|---|---|---|---|---|---|
| | | lossy | Text / Graphics / Image | | Gray |
| LOSSLESS IMAGE | Off | 0 | 0 | 0 | 0 |
| LOSSLESS IMAGE | On | 0 | 0 | 0 | 1 |
| LOSSY IMAGE | Off | 1 | 0 | 0 | 0 |
| LOSSY IMAGE | On | 1 | 0 | 0 | 1 |
| GRAPHIC | Off | 0 | 0 | 1 | 0 |
| GRAPHIC | On | 0 | 0 | 1 | 1 |
| LINE | Off | 0 | 1 | 0 | 0 |
| LINE | On | 0 | 1 | 0 | 1 |
| CHARACTER | Off | 0 | 1 | 1 | 0 |
| CHARACTER | On | 0 | 1 | 1 | 1 |

FIG. 20

| ATTRIBUTE | GRAY COMPENSATION | BIT STRING | | | |
|---|---|---|---|---|---|
| | | face | Text / Graphics / Image | | CMS |
| IMAGE | Off | 0 | 0 | 0 | 0 |
| IMAGE | On | 0 | 0 | 0 | 1 |
| FACE IMAGE | Off | 1 | 0 | 0 | 0 |
| FACE IMAGE | On | 1 | 0 | 0 | 1 |
| GRAPHIC | Off | 0 | 0 | 1 | 0 |
| GRAPHIC | On | 0 | 0 | 1 | 1 |
| LINE | Off | 0 | 1 | 0 | 0 |
| LINE | On | 0 | 1 | 0 | 1 |
| CHARACTER | Off | 0 | 1 | 1 | 0 |
| CHARACTER | On | 0 | 1 | 1 | 1 |

PRINTING APPARATUS AND CONTROL METHOD THEREFOR

FIELD OF THE INVENTION

The present invention relates to a printing technique.

BACKGROUND OF THE INVENTION

Recently, there have been used image forming apparatuses employing an electrophotographic method, such as a laser beam printer, as an output apparatus to be connected to a computer. Such image forming apparatuses have a function of receiving an instruction from a host computer as image-source data and outputting it on paper as an image, or receiving an image inputted from an image input apparatus such as a scanner as image-source data and outputting it on paper as an image.

FIG. 18 is a block diagram showing the functional configuration of a common image forming apparatus. Description will be made below on a process to be performed in the case of receiving an instruction from a host computer as image-source data and outputting it on paper as an image, with the use of FIG. 18.

Reference numeral 2201 denotes a host computer. A user operates the host computer 2201 to execute a printer driver and thereby generates image-source data. The print-source data generated here is commonly written in a printer control language for creating a page image, which is called PDL (Page Description Language). PDL data includes data such as characters, graphics and images.

The generated image-source data is transmitted to a printer controller 2202 of a printer connected via a network or the like. The printer controller 2202 is configured by a host instruction interpretation section 2203, an image generation instruction generation section 2204, an image generation section 2205, an image processing section 2206, a first storage device 2207 and a second storage device 2208.

Reference numeral 2209 denotes a printer engine connected to the printer controller 2202. The printer engine 2209 receives an image generated in a predetermined image format from the printer controller 2202 and outputs the received image on paper. In general, the image format inputted into a printer engine is a frame sequential image format for one-tone, two-tone or four-tone C (cyan), M (magenta), Y (yellow) and K (black) color printing.

The image-source data sent from the host computer 2201 is interpreted by the host instruction interpretation section 2203, and an instruction which can be interpreted by the image generation section 2205 is generated by the image generation instruction generation section 2204. The instruction generated by the image generation instruction generation section 2204 is stored in the first storage device 2207. The image generation section 2205 reads the instruction stored in the storage device 2207 and generates a bitmap image in the first storage device 2207. The generated bitmap image may be stored in the second storage device 2208 which has a larger capacity in comparison with the first storage device 2207. This is performed in order to reutilize the generated image, and, in general, image compression processing such as JPEG is performed for the bitmap image before it is stored. Generally, a hard disk is used as the second storage device 2208. The bitmap image stored in the first storage device 2207 may be compressed, for example, with the use of the JPEG coding method and then stored in the first storage device 2207.

Image processings such as color conversion and dithering are performed for the bitmap image generated in the first storage device 2207 by the image processing section 2206. When compressed data is stored in the first storage device 2207, the compressed data is decoded at this point, and then the above image processings are performed. This is because, if the image generation section 2205 generates an RGB image, conversion into an image format which can be transferred to the printer engine 2209 is required before transferring the image to the printer engine 2209. In this case, the RGB image stored in the first storage device 2207 is converted to a CMYK image with the use of a lookup table method or the like, and then further converted to a low-tone image by dithering processing. Processing such as smoothing may be performed by the image processing section 2206 to obtain a more desirable image.

By transferring the generated image data to the printer engine 2209, an image is outputted on paper. Through the processings described above, the process of outputting an instruction from the host computer on paper as image-source data has been completed.

Now, description will be made on a process to be performed when an image inputted from an image input apparatus such as a scanner and a digital camera is outputted on paper as image-source data.

Reference numeral 2210 denotes a scanner, which optically scans an image printed on paper or film, measures the intensity of reflected light and transmitted light of the image, performs A/D conversion, and transmits obtained digital image data to the printer controller 2202. Reference numeral 2220 denotes a digital camera, which changes light intensity into an electrical signal with a CCD configured by arrayed photodiodes and thereby transmits digital image data to the printer controller 2202. In this case, the digital image data generally becomes an RGB bitmap image.

The image data transmitted from the scanner 2210 or the digital camera 2220 is stored in the first storage device 2207. The data stored here also may be compressed and stored in the second storage device 2208. The image data is then converted to a low-tone CMYK image with the use of the method described above and transferred to the printer engine 2209 to output an image on paper. The process of outputting an image inputted from an image input apparatus such as a scanner on paper as image-source data now ends.

There is known a method of adding attribute information to image-source data inputted into a printer controller to switch image processing on a particular processing basis (for example, for each pixel or each object) in the image data generation process described above in order to output a more desirable image on paper.

For example, dither matrices used for dithering may be switched according to types of data included in PDL data transmitted to the printer controller, or lookup tables used for conversion from RGB to CMYK may be switched. In this case, the image generation section 2205 generates an attribute signal indicating which data type pixel belongs to, in addition to a bitmap image. The attribute signal and the bitmap image are coded with an image signal encoding method such as the JPEG and JBIG methods, then stored in the first storage device 2207, and transferred to the image processing section 2206. The image processing section 2206 decodes the encoded bitmap image and attribute signal, and determine which type each pixel constituting the decoded bitmap image belongs to by checking the decoded attribute signal. The image processing section 2206 then switches color conversion or a dither matrix to perform processing.

As described above, an attribute signal is generated by the image generation section 2205, and thereby it is possible to switch image processing for each data included in input data.

With regard to an image read from a scanner, there also may be a case where switching of image processing for each area is desired. In this case, for example, pattern matching is performed for an inputted bitmap image to determine the image included in the bitmap image, and an attribute signal is generated based on the result of the determination. Such an attribute signal is stored in the first storage device 2207, same as the case of PDL described above.

By generating an attribute signal from an inputted bitmap image as described above, it is possible to switch processing for each area in the bitmap image.

Conventional attribute information is in a format that can be appropriate for all image input apparatuses and all output modes in order to cope with various situations about what type of apparatus image-source data has been sent from, which print mode the image-source data is to be printed in, and the like.

However, the size of attribute information in a format that can be appropriate for all the situations is larger as the number of situations increases. Therefore, when such large-sized attribute information is held in the printer controller 2202, a large amount of the RAM capacity in the printer controller 2202 is occupied by the attribute information. In order to solve this problem, the bitmap resolution is lowered, or a part of attribute signals of the attribute information are deleted. This causes a problem of increase in frequency of causing degradation of the bitmap image quality.

SUMMARY OF THE INVENTION

The present invention has been made in consideration of the above problem, and its object is to provide a technique for generating attribute information having format according to various situations related to printing.

In order to achieve an object of the present invention, for example, an image processing apparatus of the present invention comprises the following arrangement.

That is, an image processing apparatus comprises:

receiving means for receiving image data sent from external equipment;

decision means for deciding the format of attribute information based on information obtained from the external equipment;

creation means for creating the attribute information based on the format decided by the decision means;

image processing means for performing image processing for the image data in accordance with the attribute information created by the creation means; and output means for outputting the image data for which the image processing has been performed by the image processing means.

In order to achieve an object of the present invention, for example, a method for controlling an image processing apparatus of the present invention comprises the following arrangement.

That is, a method for controlling an image processing apparatus comprises:

a receiving step of receiving image data sent from external equipment;

a decision step of deciding the format of attribution information based on information obtained from the external equipment;

a creation step of creating the attribution information based on the format decided at the decision step;

an image processing step of performing image processing for the image data in accordance with the attribute information created at the creation step; and an output step of outputting the image data for which the image processing has been performed at the image processing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows an example of a format for a scanner;

FIG. 5 shows a table for defining, for each attribute, each of bits constituting attribute information in accordance with the format for a scanner;

FIG. 6 shows an example of a format for a computer;

FIG. 7 shows a table for defining, for each attribute, each of bits constituting attribute information in accordance with the format for a computer;

FIG. 11 shows a table for defining, for each attribute, each of bits constituting attribute information in accordance with the format for a CAD mode;

FIG. 12 shows an example of a format for a picture image quality mode;

FIG. 13 shows a table for defining, for each attribute, each of bits constituting attribute information in accordance with the format for a picture image quality mode;

FIG. 15 shows an example of an attribute information format to be decided when the print data sending source is the scanner 401 and the output mode indicated by output information is a picture image quality mode;

FIG. 16 shows a table for defining, for each attribute, each of bits constituting attribute information in accordance with the format shown in FIG. 15;

FIG. 20 shows a table for defining, for each attribute, each of bits constituting attribute information in accordance with the format for a digital camera.

DETAILED DESCRIPTION OF THE PREFERRED EMBODIMENTS

Preferred embodiments of the present invention will now be described in detail in accordance with the accompanying drawings.

First, description will be made on a laser beam printer (hereinafter referred to as an LBP), which is an example of a printing apparatus according to the present invention. It will be apparent from the following description of each of the embodiments that the embodiments do not limit the printing apparatus to an LBP but are applicable to printing apparatuses for various printing types.

Figure 1:
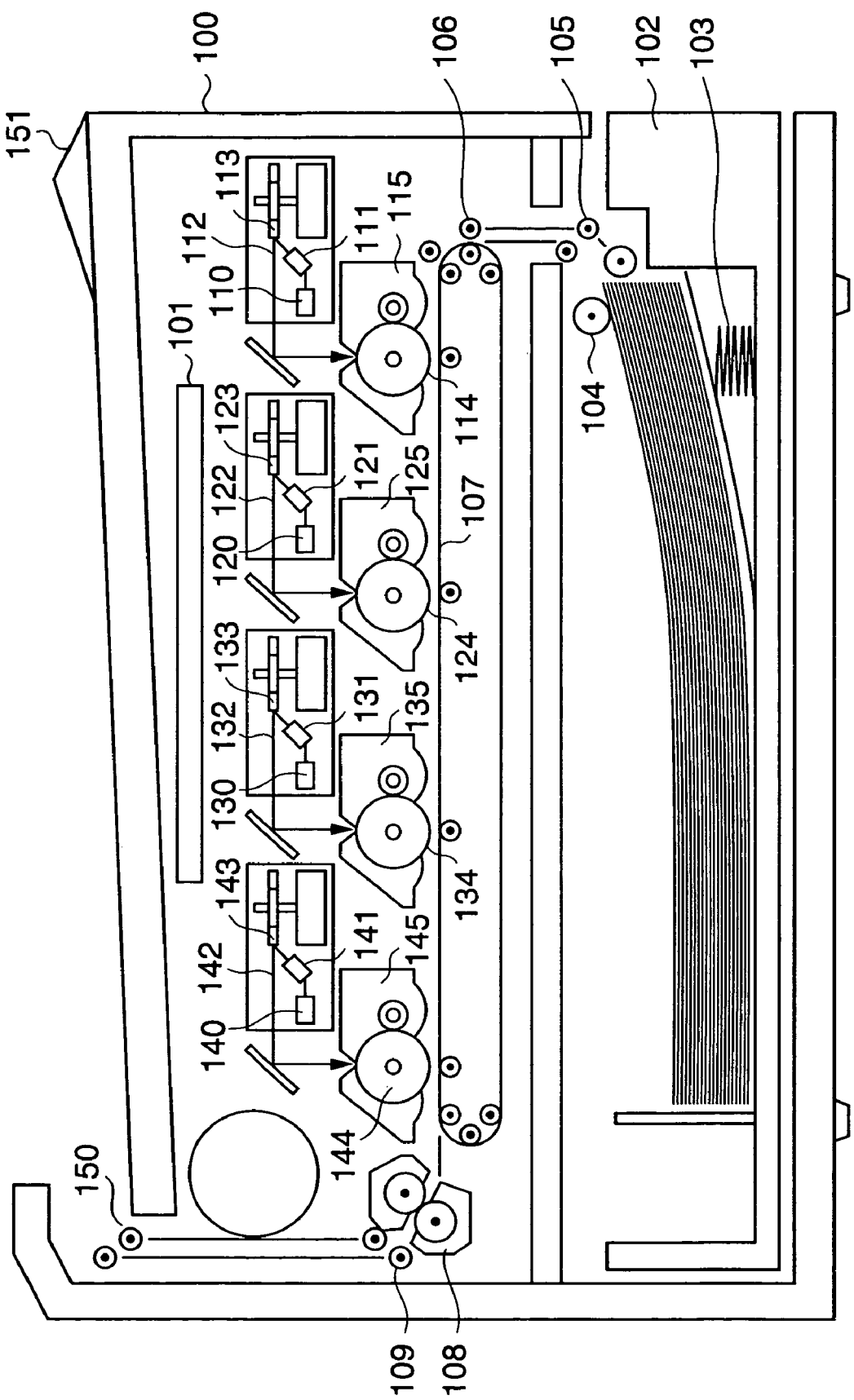
FIG. 1 shows the basic configuration of an LBP, an example of a printing apparatus according to an embodiment of the present invention.

FIG. 1 shows the basic configuration of an LBP, which is an example of a printing apparatus used in the following embodiments. In this figure, reference numeral 100 denotes the LBP body, which creates, in accordance with a character printing instruction, a graphic rendering instruction for various graphics, an image drawing instruction, a color specification instruction or the like supplied by a computer connected externally (301 in FIG. 2), a corresponding character pattern, a graphic, an image or the like, and forms an image on recording paper which is an example of a recording medium.

Reference numeral 151 denotes an operation panel on which switches for operation, an LED indicator for indicating the state of the printer, an LCD indicator and the like are arranged. Reference numeral 101 denotes a printer control unit for controlling the entire LBP 100 and analyzing the character printing instruction and the like supplied from the computer (301 in FIG. 2). Since the LBP in this embodiment converts RGB color information to C (cyan), M (magenta), Y (yellow) and K (black) and performs image formation and development of CMYK in parallel, each of CMYK has its own image formation/development mechanisms.

The printer control unit 101 generates a print image for each of CMYK, converts it to a video signal and outputs the video signal to a laser driver for each of CMYK. A laser driver 110 for M (magenta) is a circuit for driving a semiconductor laser 111 and switches on/off a laser beam 112 emitted from the semiconductor laser 111 in accordance with an inputted video signal. The laser beam 112 is horizontally swung to scan over an electrostatic drum 114. Thereby, an electrostatic latent image of a character or graphic pattern is formed on the electrostatic drum 114. This latent image is developed by a development unit (toner cartridge) 115 arranged along the electrostatic drum 114 and then transferred to recording paper. The same image formation/development mechanisms as that for M (magenta) are also provided for C (cyan), Y (yellow) and K (black). Reference numerals 120, 121, 122, 123, 124, and 125 denote image formation/development mechanisms for C (cyan); reference numerals 130, 131, 132, 133, 134 and 135 denote image formation/development mechanisms for Y (yellow); and reference numerals 140, 141, 142, 143, 144 and 145 denote image formation/development mechanisms for K (black). The function of each image formation/development mechanisms is the same as that for M (magenta), and description thereof will be omitted.

Cut sheets are used as the recording paper. The cut sheet recording paper is stored in a paper feeding cassette 102 mounted on the LBP and kept at a predetermined height with a spring 103. The cut sheet paper is taken into the apparatus by a paper feeding roller 104 and carrying rollers 105 and 106, placed on a paper carrying belt 107, and then pass through each of the CMYK image formation/development mechanisms described above. The toner (power ink) for each of CMYK which has been transferred to the recording paper is fixed on the recording paper by a fixer 108 with heat and pressure, and outputted to the upper part of the LBP body by carrying rollers 109 and 150.

Figure 2:
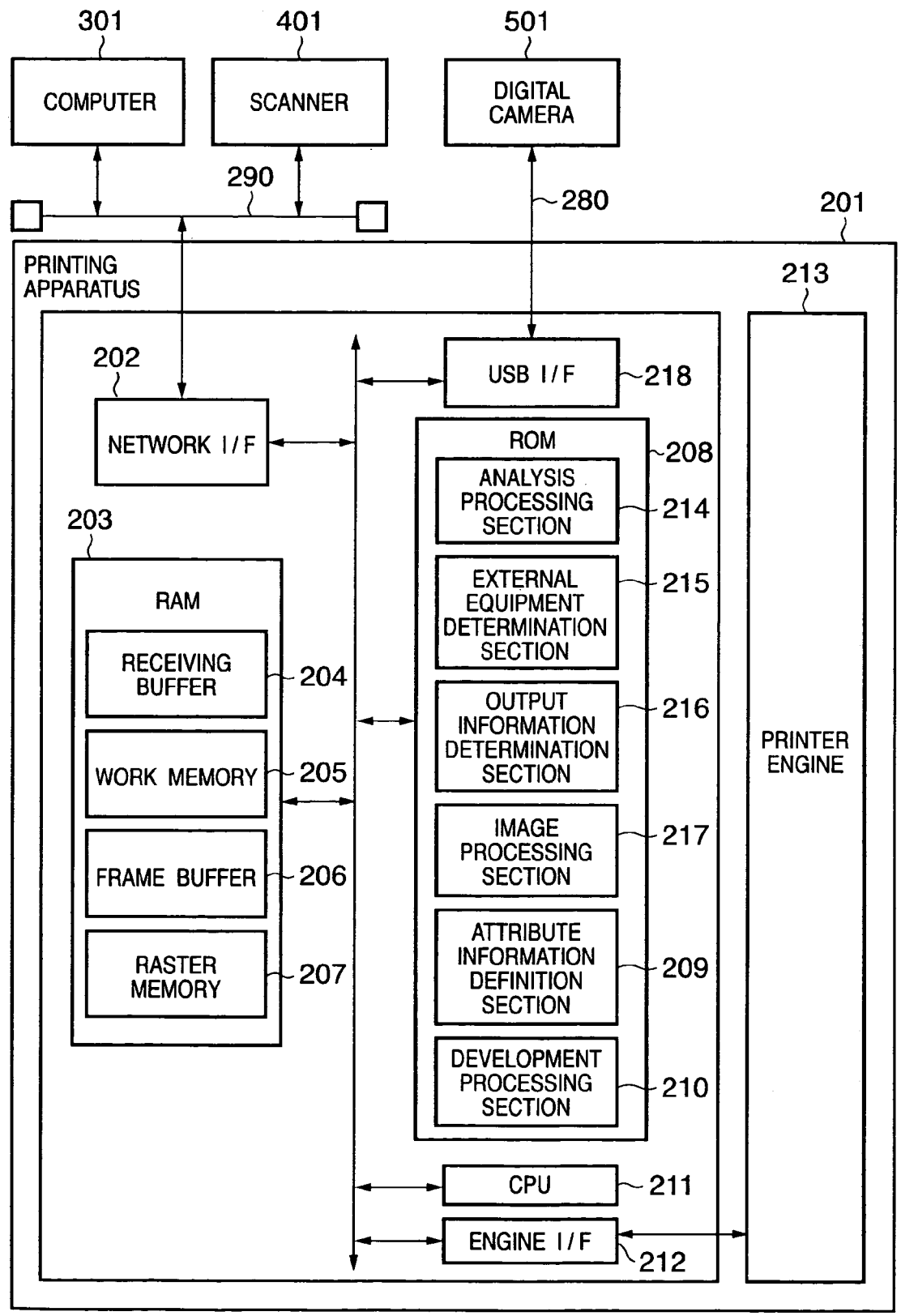
FIG. 2 is a block diagram showing a printing system including the printing apparatus according to the embodiment of the present invention, and the basic configuration of the printing apparatus.

FIG. 2 is a block diagram showing a printing system including a printing apparatus according to the following embodiment, and the basic configuration of the printing apparatus.

In this figure, reference numeral 301 denotes a computer for editing an image with the use of an application or the like and sending print data to a printing apparatus 201 via a printer driver. Reference numeral 401 denotes a scanner for reading information from a recording medium such as paper, converting the information to digital data and sending it to the printing apparatus 201. Reference numeral 501 denotes a digital camera for obtaining image data as digital data by imaging, storing the image data in a recording medium inserted in itself, such as a memory card, and connecting to the printing apparatus 201 to send the image data to the printing apparatus 201. The image data held by the digital camera 501 may be once acquired into a computer (such as a personal computer and a workstation) 301 and then sent by the computer 301 to the printing apparatus 201. The same goes for the scanner 401.

Reference numeral 201 denotes the printing apparatus body, which has components described below. Reference numeral 202 denotes a network I/F for performing data communication with devices such as the computer 301 and the scanner 401 connected to a network 290. The printing apparatus 201 receives print data sent from the computer 301 or image data sent from the scanner 401 via the network I/F 202. Reference numeral 218 denotes a USB I/F for performing data communication with the digital camera 501 connected via a signal line in accordance with the USB. The printing apparatus 201 receives image data sent from the digital camera 501 via the USB I/F 218.

Reference numeral 203 denotes a RAM for temporarily storing various information and can secure an area to be described later.

Reference numeral 204 denotes a receiving buffer, which is an area for storing print data and image data received via the network I/F 202 and image data received via the USB I/F 218. Reference numeral 205 denotes a work memory, which is used by a CPU 211 to perform various processings. For example, it is temporarily used when inputted data is converted to an intermediate code. Reference numeral 206 is a frame buffer, which is an area for storing an intermediate code inside the printer. Reference numeral 207 denotes a raster memory, which is an area for storing data obtained by developing an intermediate code.

Reference numeral 208 denotes a ROM, in which the code of each of the following programs to be executed by the CPU 211 of the printing apparatus 201 to perform various processings.

Reference numeral 214 denotes an analysis processing section, which is a program for causing the CPU 211 to perform the processing of analyzing data read from the receiving buffer 204 and allocating the data to predetermined processings. Reference numeral 215 denotes an external equipment determination section, which is a program for causing the CPU 211 to perform the processing of determining the sending source of received data. Reference numeral 216 denotes an output information determination section, which is a program for causing the CPU 211 to perform the processing of referring to information about output of received data (output information) and notifying the result of the reference to other programs. Reference numeral 217 denotes an image processing section, which is a program for causing the CPU 211 to perform image processings for data stored in a raster memory 207 (raster data). Reference numeral 209 denotes an attribute information definition section, which is a program for causing the CPU 211 to perform the processing of deciding (defining) the format of attribute information (information indicating attributes of each pixel or each object, as described above) based on the result of determination by the external equipment determination section 215 and/or by the output information determination section 216. Reference numeral 210 denotes a development processing section, which is a program for causing the CPU 211 to perform the processing of developing an intermediate code stored in the frame buffer 206 and storing it in the raster memory 207.

In addition, there are stored programs and data for causing the CPU 211 to control the entire printing apparatus 201, such as setting data for the printing apparatus 201 and a program for activating the printing apparatus 201 in the ROM 208.

Reference numeral 211 denotes a CPU, which controls the entire printing apparatus 201 with the various programs and data stored in the ROM 208 and performs various processings to be described later.

Reference numeral 212 denotes an engine I/F for performing data communication with a printer engine 213. Reference numeral 213 denotes a printer engine for forming a latent image on a photoconductor drum through a well-known electrophotographic process and transferring the image and performing fixation and printing.

The configuration shown in FIG. 2 is such as can be applicable to all the embodiments below. The configuration of the printing apparatus used in each embodiment may be adapted to have only the components to be used by the embodiment.

First Embodiment

Figure 3:
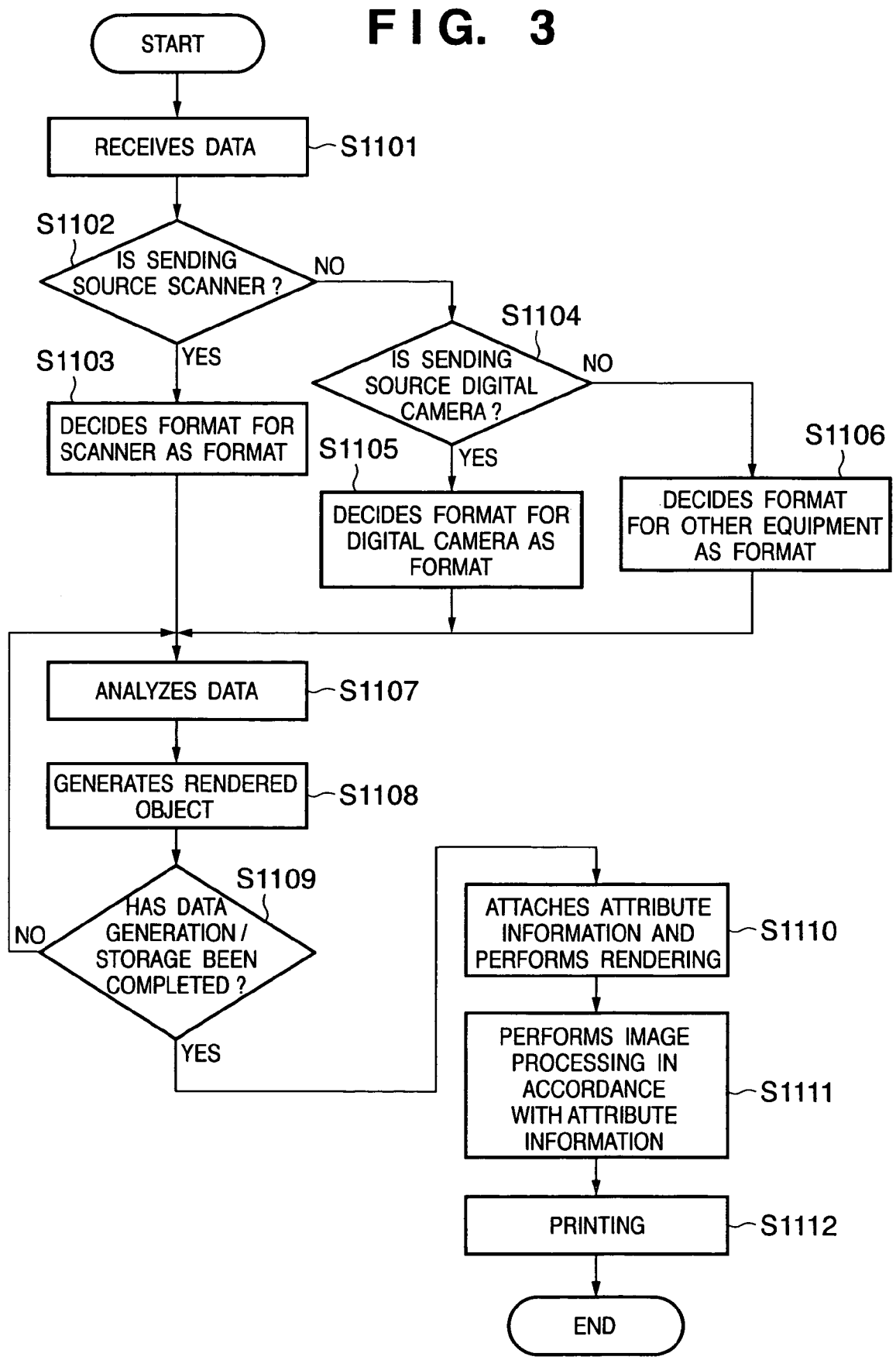
FIG. 3 is a flowchart of a printing process according to a first embodiment of the present invention.

FIG. 3 is a flowchart of a printing process according to this embodiment which is to be performed by the above printing apparatus. The programs for causing the CPU 211 to perform processings in accordance with the flowchart of this figure correspond to the above-described components stored in the ROM 208. By the CPU 211 executing these programs, the printing apparatus performs the processings in accordance with the flowchart shown in FIG. 3.

Since all print data and image data to be inputted to the printing apparatus 201 are intended to be printed, such data may be collectively referred to as print data in the description below.

Print data received from the computer 301 via the network I/F 202, image data received from the scanner 401 via the network I/F 202 or image data received from the digital camera 501 via the USB I/F 218 is stored in the receiving buffer 204 (step S1101). The data stored in the receiving buffer 204 is hereinafter referred to as print data.

It is assumed that information indicating which apparatus the print data has been obtained from is recorded in the received print data. Thus, in this figure, when generating print data, the computer 301 attaches "a computer-specific code" to the print data as header information. Similarly, when having obtained image data as digital data through scanning, the scanner 401 attaches "a scanner-specific code" to the image as header information. Similarly, when having obtained an image through imaging, the digital camera 501 attaches "a digital-camera-specific code" to the image.

In this way, each equipment (in the figure, the computer, the scanner or the digital camera) attaches a code indicating the type of equipment to an obtained image as the header information.

The method for obtaining information indicating at which apparatus print data has been obtained is not limited to the above method in which the information is obtained by attached header information. For example, the information may be acquired by the printing apparatus 201 via the network I/F 202 as network protocol information.

Accordingly, the CPU 211 reads one of print data stored in the receiving buffer 204, refers to the above-described code in header information attached to the print data and determines whether or not the print data has been sent from the scanner 401 (step S1102). This determination processing is achieved by executing the program of the external equipment determination section 215. In this case, there are stored codes specific to various types of equipment in the ROM 208 of the printing apparatus 201, and the CPU 211 refers to these codes stored in the ROM 208 to determine which equipment the code in the header information is specific to.

As a result of the determination processing, if it is determined that the print data has been sent from the scanner 401, that is, the code is a scanner-specific code, then the process proceeds to step S1103, where the format for a scanner is decided as the format of attribute information to be generated (step S1103).

FIG. 4 shows an example of the format for a scanner. FIG. 5 shows a table for defining, for each attribute, each of bits constituting attribute information in accordance with the format for a scanner.

As shown in FIG. 4, the format for a scanner is configured by a bit indicating whether thin/small or not (Thin/Small), a bit indicating whether text, graphic or image (Text/Graphic/Image), and a bit indicating whether or not to perform gray compensation (gray compensation), for each of attributes such as image, graphic, line, character, thin line and lowercase character. Gray compensation is, in the case of R=G=B, for example, to replace B with Bk and print black or gray with toner for Bk. These bits are decided by attributes and by whether or not to perform gray compensation (ON/OFF) as shown in FIG. 5. Since information about the attributes and about whether or not to perform gray compensation is included in header information of print data, each bit value is decided based on the information.

On the other hand, if it is determined by the determination processing at step S1102 that the print data has not been sent from the scanner 401, that is, the code is not a scanner-specific code, then the process proceeds to step S1104, where it is determined whether or not the print data has been sent from the digital camera 501 (step S1104).

As a result of the determination processing, if it is determined that the print data has been sent from the digital camera 501, that is, the code is a digital-camera-specific code, then the process proceeds to step S1105, where the format for a digital camera is decided as the format of attribute information to be generated (step S1105).

Figure 19:
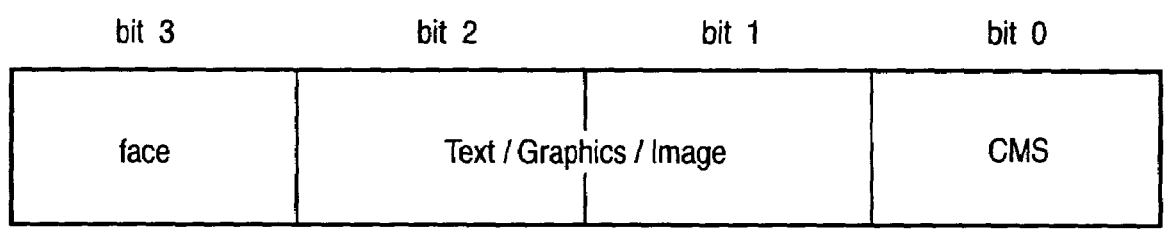
FIG. 19 shows an example of the format for a digital camera.

FIG. 19 shows an example of the format for a digital camera. FIG. 20 shows a table for defining, for each attribute, each of bits constituting attribute information in accordance with the format for a digital camera.

As shown in FIG. 19, the format for a digital camera is configured by a bit indicating whether a face image or not (face), a bit indicating whether text, graphic or image (Text/Graphic/Image), and a bit whether or not to perform CMS (Color Matching System) processing (CMS), for each of attributes such as image, face image, graphic, line and character. The CMS processing is processing for achieving color matching by performing conversion of image data from a color space specific to each apparatus (device dependent color space) to a color space which does not depend on an apparatus (device independent color space) or conversion opposite to the conversion, based on a profile which is data indicating conversion characteristics of each apparatus and stored in a host computer in advance. These bits are decided by attributes and by whether or not to perform gray compensation as shown in FIG. 20. Since information about attributes and about whether or not to perform gray compensation is included in header information of print data, each bit value is decided based on the information.

On the other hand, if it is determined as a result of the determination processing at step S1104 that the print data has not been sent from the digital camera 501, that is, the code is not a digital-camera-specific code, then the process proceeds to step S1106, where the format for other equipment is decided as the format of attribute information to be generated (step S1105). This "other equipment" is the computer 301 in this embodiment.

FIG. 6 shows an example of the format for a computer. FIG. 7 shows a table for defining, for each attribute, each of bits constituting attribute information in accordance with the format for a computer.

As shown in FIG. 6, the format for a computer is configured by a bit indicating whether thin/small or not (Thin/Small), a bit indicating whether text, graphic or image (Text/Graphic/Image), and a bit indicating whether or not to perform CMS processing (CMS), for each of attributes such as image, graphic, line, character, thin line and lower-case character. These bits are decided by attributes and by whether device CMS is available or not (ON/OFF) as shown in FIG. 7. Since information about the attributes and about whether or not device CMS is available is included in header information of print data, each bit value is decided based on the information. The data of a table which defines, for each attribute, each of bits constituting attribute information in accordance with a format of each of the above equipment (the computer 301, the scanner 401 and the digital camera 501) is stored in the ROM 208 and can be referred to as required.

Through the processings described above, the format of attribute information to be generated can be decided based on equipment which has inputted the print data. The attribute information format decision processing at each of the steps S1103, S1105 and S1106 is achieved by executing the program of the attribute information definition section 209.

Next, the program of the analysis processing section 214 is executed to perform the processing of analyzing data in the print data (step S1107). Then, the program of the development processing section 210 is executed to perform the processing of generating a rendered object and storing the data of the generated rendered object in the frame buffer 206 (step S1108). The series of processings of steps S1107 and S1108 are to be performed for "all objects to be rendered" included in the print data. The processings of steps S1107 to S1109 are well known techniques for generating a rendered object, and detailed description thereof will be omitted.

When rendered object data has been generated for all the objects and stored in the frame buffer 206 (step S1109), the process proceeds to step S1110, where rendering processing is performed for each of the rendered objects stored in the frame buffer 206 to generate a raster image. At the same time, attribute information indicating attributes of each rendered object is generated in accordance with the format decided through the above process, attached to the rendered object and stored in the raster memory 207 (step S1110).

Then, the program of the image processing section 217 is executed to sequentially perform image processings for a raster image stored in the raster memory 207 (step S1111). For example, in the image processings, the raster image is converted to a CMYK image with a method using a lookup table or the like, and further converted to a lower-tone image with dithering processing. Processing such as smoothing may be performed to obtain a more desirable image.

When image processings are performed for a raster image, attribute information attached to the raster image is referred to, and a dither matrix used for dithering processing may be switched, or a lookup table used for performing color conversion from RGB to CMYK may be switched, based on the attributes of the raster image, as described above.

After the image processings performed at step S1111, the raster image is sent to the printer engine 213 via the engine I/F 212 (step S1112). Then, the printer engine 213 performs the processing of recording the raster image received via the engine I/F 212 on a recording medium.

Figure 17:
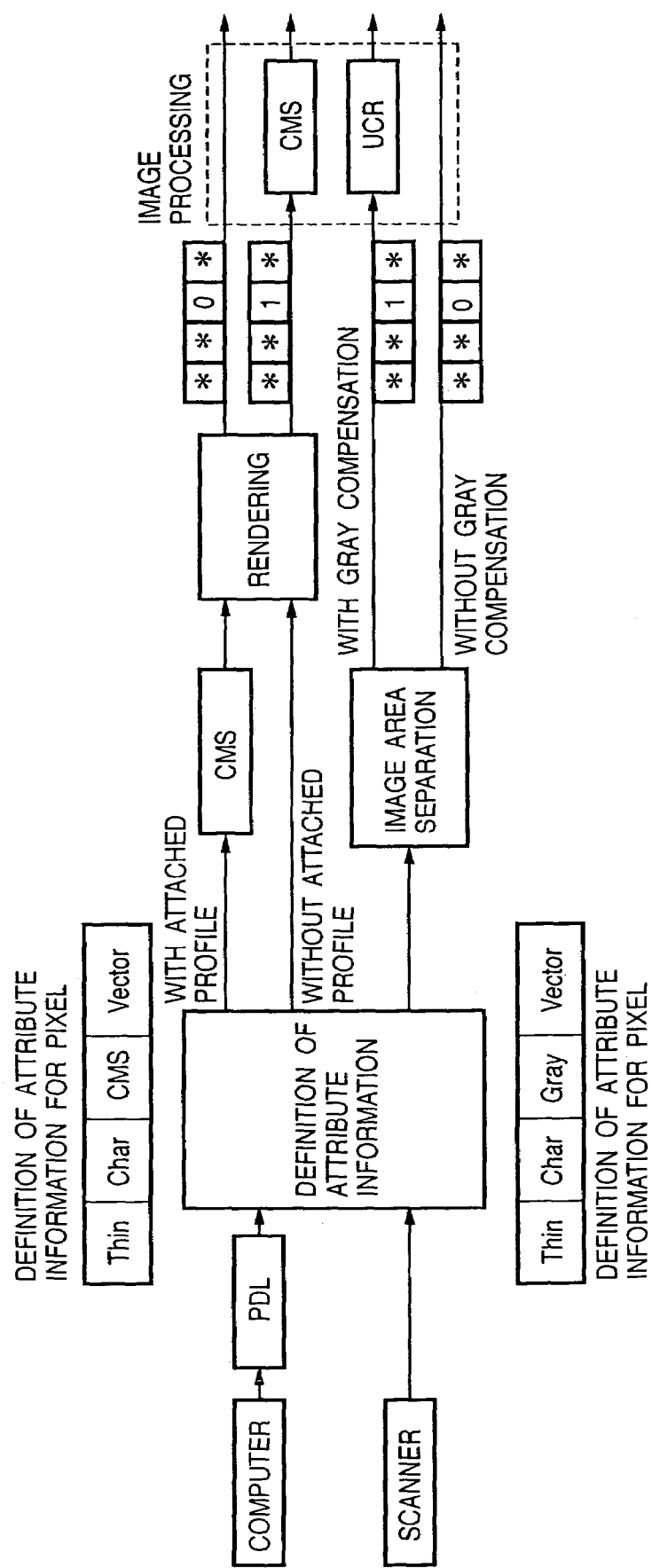
FIG. 17 shows an example of detailed control flow in the first embodiment of the present invention.
Figure 18:
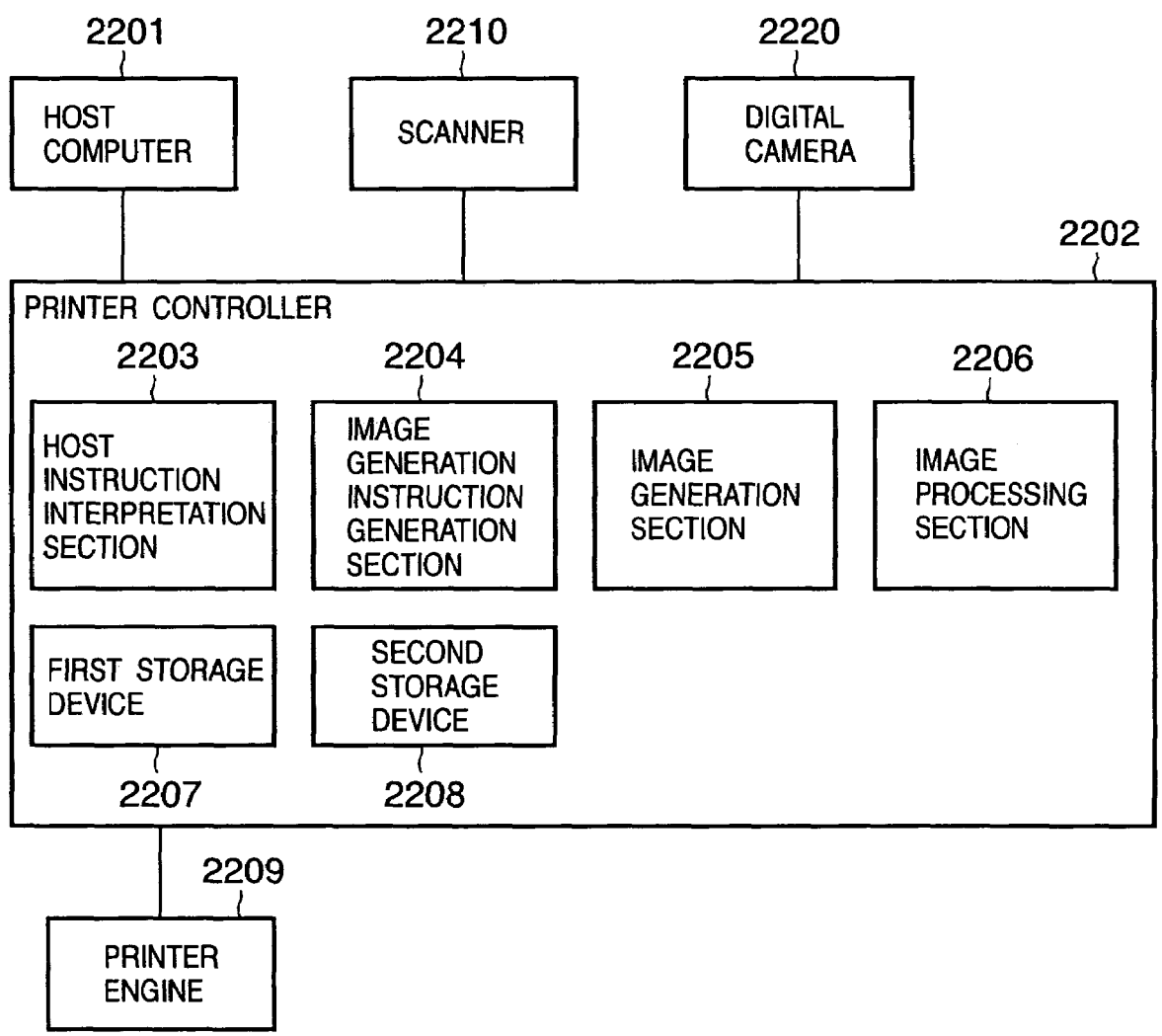
FIG. 18 is a block diagram showing the functional configuration of a common image forming apparatus.

FIG. 17 shows an example of detailed control flow in this embodiment. Attribute definition is performed for each of PDL data sent from a computer and image data from a scanner. As for the PDL data, an attribute signal is generated based on availability of CMS specified in the data when rendering is performed, and whether or not to perform CMS processing is determined in accordance with the CMS attribute signal. As for the image data from the scanner, a signal of an image area for gray compensation is generated by image area separation processing when rendering is performed, and whether or not to perform gray compensation is determined in accordance with the gray compensation attribute signal.

As described above, according to this embodiment, the format of attribute information is changed depending on equipment which has sent print data to a printing apparatus. Thereby, it is possible to create attribute information even if print data is received from any equipment, and it is also possible to solve the problem of "increase in size of attribute information" caused by configuring the format of attribute information in advance so that it is appropriate for all types of equipment.

The format of attribute information corresponding to each equipment shown in the above description is only an example, and the kind of each information to be included in the attribute information and the bit number to be allocated to each information may be changed as appropriate.

Second Embodiment

In the first embodiment, the format of attribute information is changed according to the type of equipment which has sent print data to the printing apparatus 201. In this embodiment, however, the format of attribute information is changed according to the mode of printing (output) set by the sending side of print data.

Figure 8:
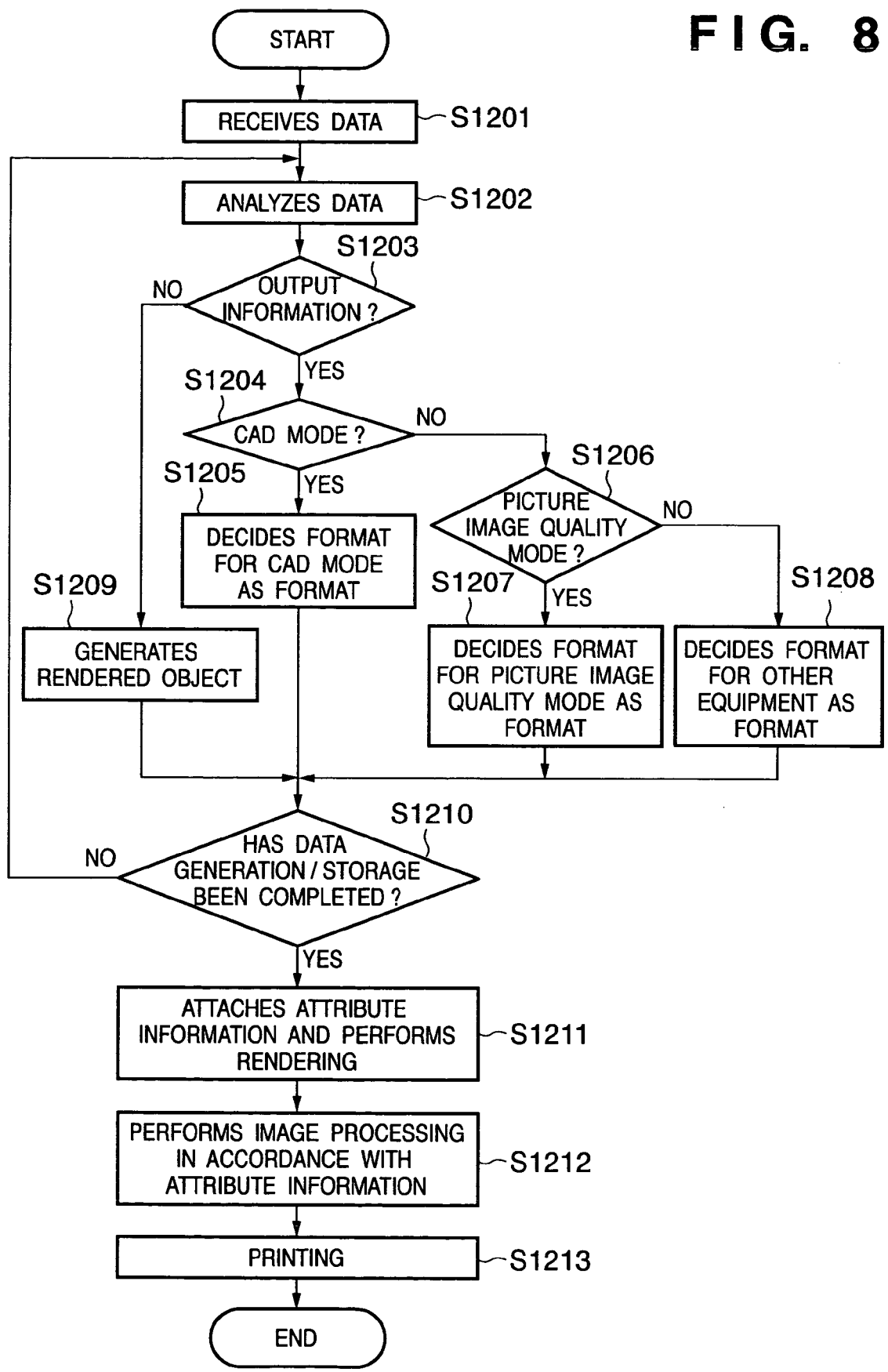
FIG. 8 is a flowchart of a printing process according to a second embodiment of the present invention.

FIG. 8 is a flowchart of a printing process according to this embodiment, which is to be performed by the above printing apparatus. The programs for causing the CPU 211 to perform processings in accordance with the flowchart of the figure correspond to the above-described components stored in the ROM 208. By the CPU 211 executing these programs, the printing apparatus performs the processings in accordance with the flowchart shown in FIG. 8.

Print data received from the computer 301 via the network I/F 202, image data received from the scanner 401 via the network I/F 202 or image data received from the digital camera 501 via the USB I/F 218 is stored in the receiving buffer 204 (step S1201). The data stored in the receiving buffer 204 is hereinafter referred to as print data.

Next, the program of the analysis processing section 214 is executed to perform the processing of analyzing data in the print data (step S1202). Then, it is checked whether or not the data being analyzed is output information (step S1202). The output information is information for specifying in which output mode printing in accordance with print data should be performed. In this embodiment, the output mode is any of a CAD mode or a picture image quality mode. The setting of the mode is made at the stage prior to sending, by the print data sending side, that is, by any of the digital camera 501, the computer 301 and the scanner 401 in this embodiment. The setting is made, for example, with the use of GUI which is displayed on a display screen of each equipment. The set output mode is included in header information of print data as output information and sent to the printing apparatus 201.

Figure 9:
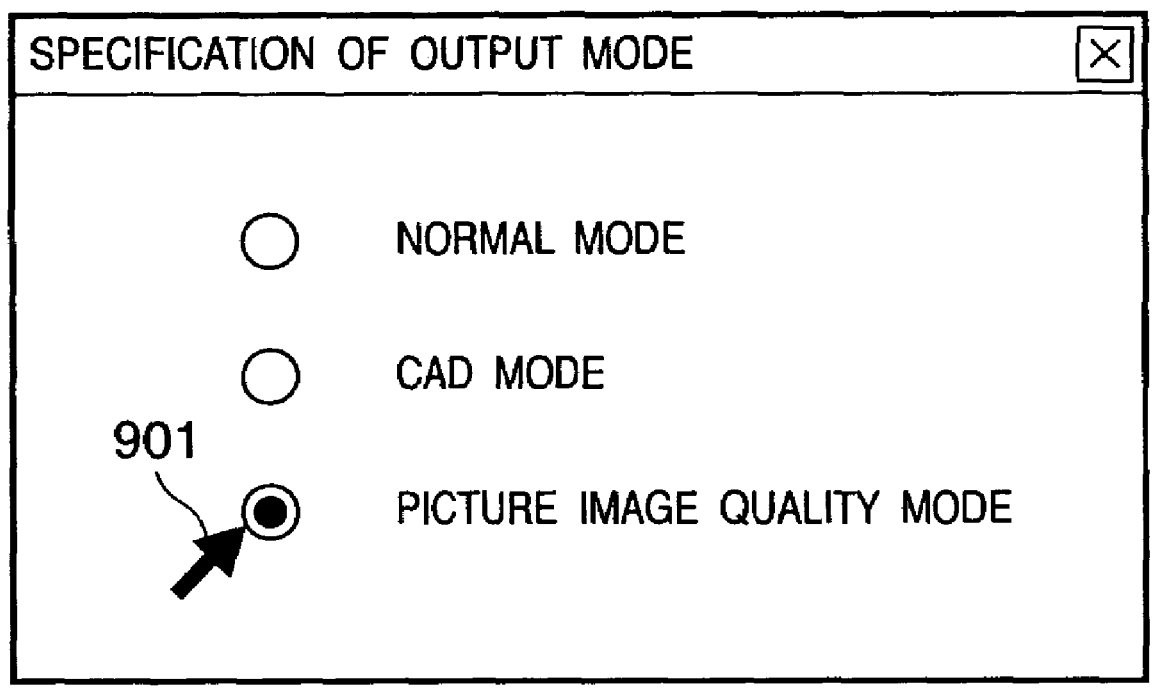
FIG. 9 shows a display example of GUI for setting an output mode in equipment (in this embodiment, any of a digital camera 501, a computer 301, a scanner 401) for sending print data to an printing apparatus 201.

FIG. 9 shows a display example of GUI for setting an output mode in equipment (in this embodiment, any of the digital camera 501, the computer 301, the scanner 401) for sending print data to the printing apparatus 201. As shown in the figure, by moving a cursor to any of the check buttons for a normal mode, a CAD mode and a picture image quality mode with the use of the operation section provided for the equipment and specifying the check button, the output mode corresponding to the specified check button is decided. The equipment then performs processing of generating output information indicating the decided output mode and attaching it to print data as header information.

Returning to FIG. 8, if the data currently being analyzed is output information, then the process proceeds to step S1204, where it is checked whether or not the output mode indicated by the output information is the CAD mode (step S1204). The checking processing is achieved by executing the program of the output information determination section 216. In this case, there are stored codes specific to various modes in the ROM 208 of the printing apparatus 201, and the CPU 211 refers to these codes stored in the ROM 208 to check which output mode is indicated by the output information in the header information.

As the result of the checking processing, if the mode is determined to be the CAD mode, that is, if the code of the output information is a CAD-mode-specific code, then the process proceeds to step S1205, where the format for the CAD mode is decided as the format of attribute information to be generated (step S1205).

Figure 10:
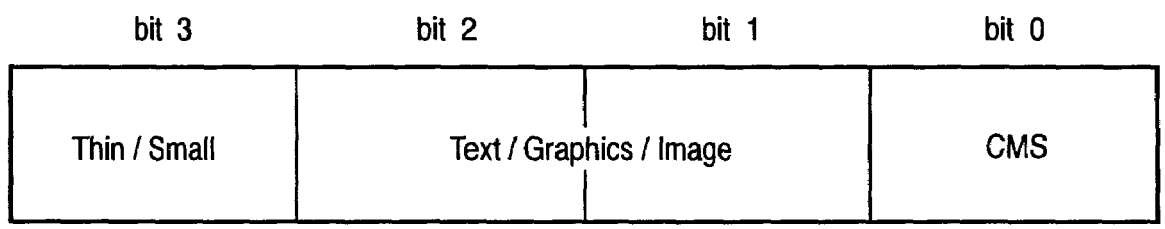
FIG. 10 shows an example of a format for a CAD mode.

FIG. 10 shows an example of the format for a CAD mode. FIG. 11 shows a table for defining, for each attribute, each of bits constituting attribute information in accordance with the format for a CAD mode.

As shown in FIG. 10, the format for a CAD mode is configured by a bit indicating whether thin/small or not (Thin/Small), a bit indicating whether text, graphic or image (Text/Graphic/Image), and a bit indicating whether or not to perform CMS processing (CMS), for each of attributes such as image, graphic, line, character, thin line and lower-case character. These bits are decided by attributes and by whether device CMS is available or not (ON/OFF) as shown in FIG. 11. Since information about the attributes and about whether device CMS is available or not is included in header information of print data, each bit value is decided based on the information.

Returning to FIG. 8, if it is determined that the mode is not the CAD mode by the checking processing at step S1204, that is, the code of the output information is not a CAD-mode-specific code, then the process proceeds to step S1206, where it is checked whether or not the output mode indicated by the output information is the picture image quality mode (step S1206). As a result of the checking processing, if it is determined that the mode is the picture image quality mode, that is, the code of the output information is a picture-image-quality-specific code, then the process proceeds to step S1207, where the format for the picture image quality mode is decided as the format of attribute information to be generated (step S1207).

FIG. 12 shows an example of the format for a picture image quality mode. FIG. 13 shows a table for defining, for each attribute, each of bits constituting attribute information in accordance with the format for a picture image quality mode. The data of a table which defines, for each attribute, each of bits constituting attribute information in accordance with a format of each of the above mode (the CAD mode and the picture image quality mode) is stored in the ROM 208 and can be referred to as required.

As shown in FIG. 12, the format for a picture image quality mode is configured by a bit indicating whether to perform lossless compression or lossy compression (lossless/lossy), a bit indicating whether text, graphic or image (Text/Graphic/Image), and a bit indicating whether or not to perform CMS processing (CMS), for each of attributes such as lossless image, lossy image, graphic, line and a character. These bits are decided by attributes and by whether device CMS is available or not (ON/OFF) as shown in FIG. 13. Since information about the attributes and about whether device CMS is available or not is included in header information of print data, each bit value is decided based on the information.

Returning to FIG. 8, if it is determined that the mode is not the picture image quality mode by the checking processing at step S1206, that is, the code of the output information is not a picture-image-quality-mode-specific code, then the process proceeds to step S1208, where the mode for other equipment is decided as the format of attribute information to be generated (step S1208).

Through the processings described above, the format of attribute information can be decided based on the output mode. If there is any data to be analyzed, then the process returns to step S1202.

If the data being analyzed is not output information (step S1203), that is, if the data is data to be rendered, then the process proceeds to step S1209, where, similarly to the first embodiment, a rendered object is generated with the use of the result of analysis at step S1202 and stored in the frame buffer 206 (step S1209).

When rendered object data has been generated for all the objects and stored in the frame buffer 206 (step S1210), the process proceeds to step S1211. Subsequently, the processing at each of steps S1211, S1212 and S1213 is performed similarly to steps S1110, S1111 and S1112, respectively.

The format of attribute information corresponding to each equipment shown in the above description is only an example, and the kind of each information to be included in attribute information and the bit number to be allocated to each information may be changed as appropriate. Furthermore, in this embodiment, output information is assumed to indicate an output mode. However, the output information is not limited thereto and may indicate output resolution, output tone, output color mode, output paper or the like.

Third Embodiment

In this embodiment, the format of attribute information is decided based on the type of equipment which has sent print data and based on an output mode. That is, the embodiment can be applied to a case where the format of attribute information may be different depending the output mode even if the sending-source equipment is the same.

Figure 14:
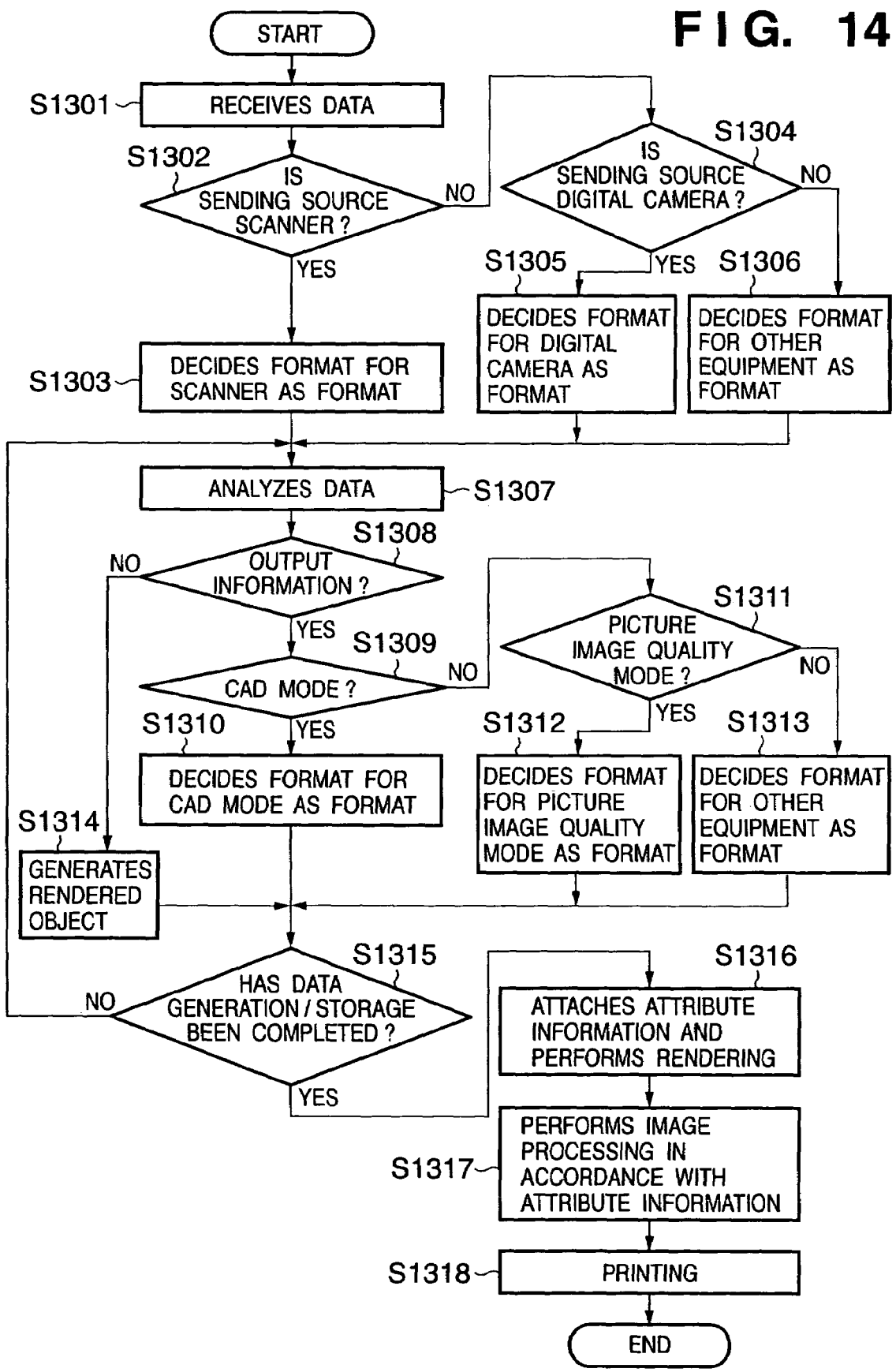
FIG. 14 is a flowchart of a printing process according to a third embodiment of the present invention.

FIG. 14 is a flowchart of a printing process according to this embodiment, which is to be performed by the above printing apparatus. The programs for causing the CPU 211 to perform processings in accordance with the flowchart of this figure correspond to the above-described components stored in the ROM 208. By the CPU 211 executing these programs, the printing apparatus performs the processings in accordance with the flowchart shown in FIG. 14.

The processing performed at each of steps S1301 to S1306 is similar to the processing performed at each of steps S1101 to S1106 in FIG. 3.

The processing performed at each of steps S1307 to S1318 is similar to the processing performed at each of steps S1202 to S1213 in FIG. 8.

That is, through the processings performed at steps S1301 to S1306, the format of attribute information corresponding to the type of equipment which has sent print data is decided. However, in this embodiment, there are multiple kinds of attribute information formats for the same sending-source equipment. That is, the format differs depending on the output mode. For example, even if the sending-source equipment is the scanner 401, the attribute information format is different when the output mode is the CAD mode from when the output mode is the picture image quality mode.

Accordingly, through the processings performed at steps S1307 to S1318, the format of attribute information corresponding to the output mode is decided. Thereby, even if the same scanner 401 is the sending source, the attribute information format corresponding to the output mode can be decided.

FIG. 15 shows an example of an attribute information format to be decided when the print data sending source is the scanner 401 and the output mode indicated by output information is the picture image quality mode. FIG. 16 shows a table for defining, for each attribute, each of bits constituting attribute information in accordance with the format shown in FIG. 15. The data of a table which defines, for each attribute, each of bits constituting attribute information in accordance with a format for each mode (the CAD mode and the picture image quality mode) in each of the above equipment (the computer 301, the scanner 401 and the digital camera 501) is stored in the ROM 208 and can be referred to as required.

As shown in FIG. 15, the format for the picture image quality mode of the scanner 401 is configured by a bit indicating whether to perform lossless compression or lossy compression (lossless/lossy), a bit indicating whether text, graphic or image (Text/Graphic/Image), and a bit indicating whether grayscaled or not (Gray), for each of attributes such as lossless image, lossy image, graphic, line and a character. These bits are decided by attributes and by whether gray compensation is available or not (ON/OFF) as shown in FIG. 16. Since information about the attributes and about whether gray compensation is available or not is included in header information of print data, each bit value is decided based on the information.

The format of attribute information corresponding to each equipment shown in the above description is only an example, and the kind of each information to be included in attribute information and the bit number to be allocated to each information may be changed as appropriate. Furthermore, in this embodiment, output information is assumed to indicate an output mode. However, the output information is not limited thereto and may indicate output resolution, output tone, output color mode, output paper or the like.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-231441 filed on Aug. 6, 2004, which is hereby incorporated by reference herein.

What is claimed is:

1. An image processing apparatus comprising:
receiving means for receiving image data sent from external equipment;
decision means for deciding the format of attribute information, wherein the attribute information is provided for each pixel or each object included in the image data, based on information which indicates a type of the external equipment and is obtained from the external equipment;
creation means for creating the attribute information based on the format decided by said decision means;
image processing means for performing image processing for the image data in accordance with the attribute information created by said creation means; and
output means for outputting the image data for which the image processing has been performed by said image processing means,
wherein the attribute information consists of bits, each of the bits represents a sub-attribute, and an attribute indicated by the attribute information is defined by the sub-attributes represented by the bits, and
wherein the format of the attribute information defines sub-attributes represented by the bits.

2. The image processing apparatus according to claim 1, wherein the external equipment is any of a computer, a scanner and a digital camera.

3. The image processing apparatus according to claim 1, wherein the image processing means switches color conversion and a dither matrix based on the attribute information created by said creation means, and then performs image processing on image data.

4. An image processing apparatus comprising:
receiving means for receiving image data sent from external equipment;
decision means for deciding the format of attribute information, wherein the attribute information is provided for each pixel of each object included in the image data, based on an output mode of the image data;
creation means for creating the attribute information based on the format decided by said decision means;
image processing means for performing image processing for the image data in accordance with the attribute information created by said creation means; and
output means for outputting the image data for which the image processing has been performed by said image processing means,
wherein the attribute information consists of bits, each of the bits represents a sub-attribute, and an attribute indicated by the attribute information is defined by sub-attributes represented by the bits, and
wherein the format of the attribute information defines sub-attributes represented by the bits.

5. The image processing apparatus according to claim 4, wherein the output mode is any of a CAD mode and a picture image quality mode.

6. A method for controlling an image processing apparatus, comprising:

a receiving step of receiving image data sent from external equipment;

a decision step of deciding the format of attribution information, wherein the attribute information is provided for each pixel or each object included in the image data, based on information obtained from the external equipment;

a creation step of creating the attribution information based on the format decided at the decision step;

an image processing step of performing image processing for the image data in accordance with the attribute information created at the creation step; and an output step of outputting the image data for which the image processing has been performed at the image processing step, wherein the attribute information consists of bits, each of the bits represents a sub-attribute, and an attribute indicated by the attribute information is defined by sub-attributes represented by the bits, and wherein the format of the attribute information defines sub-attributes represented by the bits.

7. A computer-readable medium storing a computer-executable-program for causing a computer to perform the control method according to claim 6.

8. A method for an image processing apparatus comprising the steps of:

receiving image data sent from external equipment;

deciding the format of attribute information, wherein the attribute information is provided for each pixel or each object included in the image data, based on an output mode of the image data;

creating the attribute information based on the format decided by said decision step;

performing image processing for the image data in accordance with the attribute information created by said creation step; and outputting the image data for which the image processing has been performed by said image processing step, wherein the attribute information consists of bits, each of the bits represents a sub-attribute, an attribute indicated by the attribute information is defined by sub-attributes represented by the bits, and the format of the attribute information defines sub-attributes represented by the bits.

9. A computer readable medium storing a computer program for an image processing apparatus, said program comprising:

a receiving step of receiving image data sent from external equipment;

a decision step of deciding the format of attribute information, wherein the attribute information is provided for each pixel or each object included in the image data, based on an output mode of the image data;

a creation step of creating the attribute information based on the format decided in said decision step;

an image processing step of performing image processing for the image data in accordance with the attribute information created in said creation step; and an output step of outputting the image data for which the image processing has been performed in said image processing step, wherein the attribute information consists of bits, each of the bits represents a sub-attribute, an attribute indicated by the attribute information is defined by sub-attributes represented by the bits, and the format of the attribute information defines sub-attributes represented by the bits.

* * * * *